Jan. 11, 1966  R. G. TIPPING  3,228,197
ALTITUDE COMPENSATED FAIL SAFE PRESSURE SUPPLY MECHANISM
Filed Nov. 2, 1964
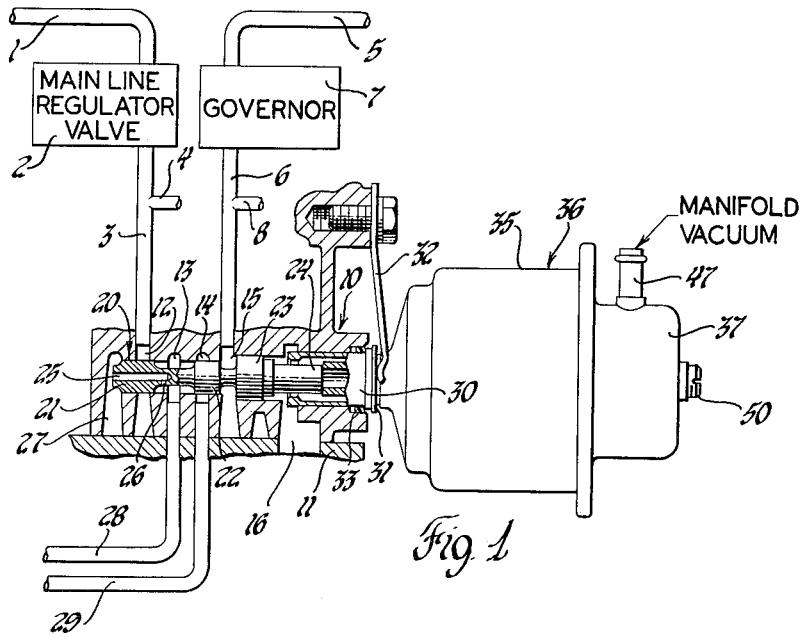
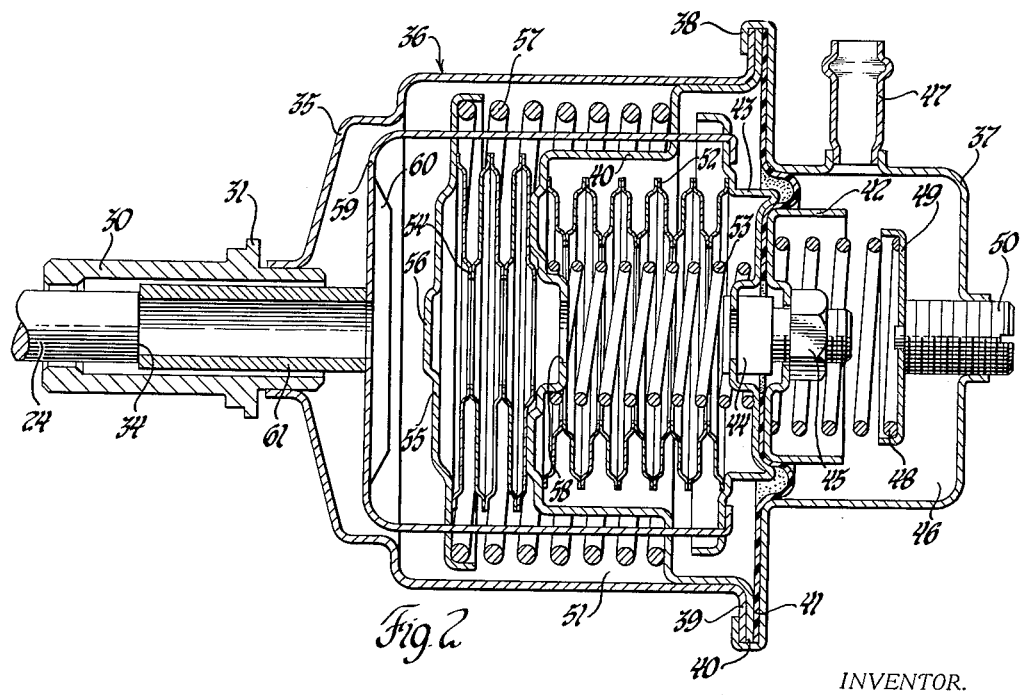
INVENTOR.
Roderick G Tipping
BY
Robert L. Spencer
ATTORNEY

United States Patent Office 3,228,197
Patented Jan. 11, 1966

3,228,197
ALTITUDE COMPENSATED FAIL SAFE
PRESSURE SUPPLY MECHANISM
Roderick G. Tipping, Livonia, Mich., assignor to General Motors Corporation, Detroit, Mich., a corporation of Delaware
Filed Nov. 2, 1964, Ser. No. 407,985
8 Claims. (Cl. 60—60)

This invention relates to pressure regulator control systems for automatic transmissions and more particularly to an improved altitude compensated modulator for use in such systems.

In automotive vehicle automatic transmission control systems it has been the practice to use a valve for delivering variable pressure which is varied with engine torque or engine torque demand as a function of engine intake manifold vacuum. This variable modulator pressure is normally delivered to the transmission shift valves for biasing the valves to their downshift position, to a line pressure regulator valve for boosting line pressure in response to increase in engine torque demand, and for other purposes.

It is well known that with a rise in the altitude that the volumetric efficiency of an internal combustion engine decreases due to drop of atmospheric pressure and that the available engine manifold vacuum decreases with increase in altitude. Accordingly, it has become the practice to provide an altitude compensating device in connection with manifold vacuum controlled modulator valves to provide the desired modulator pressures at relatively high altitudes. Such altitude compensators normally include an evacuated bellows to provide an essentially fixed reference pressure for use in the altitude compensator. Such altitude compensators are objectionable in that in the event of failure or rupture of the bellows, the modulator valve delivered pressure will substantially drop and may drop to such a low level that the line pressure in the control system is unable to sustain the torque transmitting members such as clutches and brakes in nonslipping engagement. If the torque transmitting members slip while in friction contact, such members may quickly burn up due to heat generation. This is particularly true under conditions of heavy torque demand.

The present invention provides an improved fail safe feature automatically operable upon rupture of the altitude compensator bellows to automatically render the modulator valve effective to deliver sufficient pressure to prevent destruction of the torque sustaining members.

The use of modulator valve pressure for the purpose of controlling shift valves and line pressure is fully taught in the United States patent to Oliver K. Kelley 2,875,643, and accordingly it is not deemed necessary to illustrate the entire control system in the present application.

An object of this invention is to provide in a transmission control system of the type having an altitude compensated modulator valve incorporating a closed chamber movable in response to changes of altitude to provide altitude compensation, means normally inoperative and automatically operable upon rupture of the closed chamber to control the modulator valve to maintain at least a minimum desired modulator pressure.

Another object of this invention is to provide a simple fail safe structure for an altitude compensated modulator valve normally inoperative and automatically operable upon failure of the altitude compensating unit to apply a thrust to the modulator valve to render the valve effective to operate in the manner of a nonatlitude compensated modulator valve.

A further object of this invention is to provide in an altitude compensated modulator valve of the type having a bellows having a fixed reference pressure therein, means automatically operable upon loss of the reference pressure in the bellows for rendering the compensator valve effective to operate in the manner of a nonaltitude compensated modulator valve.

A more particular object of this invention is to provide a fail safe feature for an altitude compensated modulator valve of the type having an altitude compensating bellows containing a reference pressure therein and wherein the bellows provides the primary force for urging the valve in one direction, spring means normally inoperable and automatically operable upon loss of the reference pressure to apply a spring force to the valve urging the valve in the same direction as the normally operating altitude compensating bellows.

These and other objects and advantages of this invention will be apparent from the following description and claims, taken in conjunction with the accompanying drawings, in which:

FIGURE 1 is a diagrammatic illustration of a portion of a transmission control system having a modulator valve controlled by an altitude compensator modulator unit embodying the features of this invention.

FIGURE 2 is a sectional view through the altitude compensator unit of FIGURE 1.

Referring to FIGURE 1 there is shown a modulator valve indicated generally at 10 for delivering variable pressure to a transmission control system. Valve 10 includes a valve body 11 having ports 12 through 16. A movable valve member 20 is formed to provide spaced lands 21 and 22 of equal diameter, a land 23 of greater diameter than lands 21 and 22 and a stem 24. A passage 25 in valve member 20 connects a chamber 27 at one end of land 21 to the space between lands 21 and 22. A flow control orifice 26 restricts the rate of fluid flow through passage 25.

Fluid under pressure may be supplied to a passage 1 from a pump, not shown. A line pressure regulator valve 2 may regulate the pressure in passage 3 leading to port 12. A branch passage 4 conducts pressure to various transmission control valves (not shown) used to control the drive ratio of a transmission (not shown) in a conventional manner. A passage 5 leading to a governor 7 may also be supplied with regulated pressure from pasasge 4 through a passage 5. Governor 7 is driven at a speed proportional to vehicle speed in a conventional manner and is a conventional governor effective to increase the governor pressure in passage 6 in response to increase in vehicle speed. Governor pressure delivery passage 6 is connected to port 15.

A modulator valve pressure delivery passage 28 connects to port 13. Modulator pressure in passage 28 is commonly directed to the transmission shift valves (not shown) for biasing the shift valves to their downshift position. Governor pressure from passage 6 may also be delivered to the shift valve (not shown) through a passage 8 for biasing the shift valves toward their upshift position. Modulator pressure from passage 28 may also be delivered to line pressure regulator valve 2 to increase the line pressure in passage 3 in response to increase in modulator pressure delivery passage 28. A passage 29 connected to port 14 is normally connected to exhaust and normally serves as an exhaust port for valve 20. However, at all times, regulated pressure may be admitted to passage 29 by means of a detent valve (not shown) to boost the pressure in passage 28 to a higher line pressure or limit the pressure in passage 28 to a minimum line pressure completely independent of altitude compensator pressure influence. Port 16 connects to exhaust.

A modulator housing 35 has fixed thereto a mounting sleeve 30 positioned in housing 35. A flange 31 on sleeve 30 is adapted to receive a mounting bracket 32 whereby housing 35 is retained on valve body 11. A seal 33 is disposed between flange 31 and valve body 11.

Details of the vacuum modulator indicated generally at 36 are best shown in FIGURE 2. A cover 37 is secured to modulator housing 35 by a rolled over flange 38. A ground member 40 and a diaphragm 41 extend between a housing flange 39 and are retained in assembled relationship in the assembly by flange 38. A pair of cup-shaped diaphragm protectors 42 and 43 are secured to diaphragm 41 by means of a fastener 44 and a nut 45. A chamber 46 in cover 37 is connected to an engine fuel intake manifold (not shown) through a nipple 47 and suitable tubing. A calibrating spring 48 is seated upon cup 42 and a spring seat 49. Spring seat 49 may be adjusted relative to cover 37 by a screw 50 to vary the effective force of calibrating spring 48.

Housing 35 encloses a chamber 51 connected to atmospheric pressure. An evacuated bellows 52 has one end fixed to ground member and the free or movable end fixed to member 43. A spring 53 disposed within bellows 52 tends to bias the bellows towards its expanded position. Spring 53 seats on ground member 40 and upon diaphragm protector 43. A second bellows 54 has one end fixed to ground member 40 and the opposite end fixed to a spring seat 55. A spring 57 seated upon spring seat 55 and ground member 40 tends to bias bellows 54 toward its expanded position. The two bellows 52 and 54 are connected by a passage 58 through ground member 40 so that both bellows are normally evacuated. Diaphragm protector 43 is connected to a sleeve 61 by a force transmitting strap 59. A bent up flange 60 on strap 59 is disposed in the path of travel of spring seat 55. A raised boss 56 on strap 55, may at times contact flange 60 as hereafter more fully explained. Sleeve 61 contacts an end 34 of valve stem 24.

Considering the operation of valve 20 of FIGURE 1, in general, an increase in net effective force tending to move the valve toward the left, as viewed in the drawing, will result in increased pressure to modulator pressure in passage 28. Conversely, if valve member 20 is permitted to move toward the right as viewed in the drawing, the pressure delivered to modulator pressure delivery passage 28 will decrease. Two hydraulic pressures tend to bias the valve member 20 toward the right or toward its minimum pressure delivery position. Modulator pressure from passage 28 is admitted to chamber 27 through restriction 26 and passage 25. This pressure acting on the end of land 21 tends to bias the valve to a position wherein pressure supply port 12 is blocked off and delivery port 13 is connected to exhaust port 14 and passage 29. Since land 23 is of greater diameter than land 22, governor pressure delivered to port 15 and acting on the differential area of lands 23 and 22 provides a thrust on valve member 20 tending to move the valve toward the right or toward its minimum pressure position.

The primary force tending to move the valve member 20 toward the left or toward its maximum pressure delivery position is derived from evacuated bellows 52 acting upon cup member 43 and force transfer strap 59. While spring 53 tends to move the bellows toward its expanded position, the springs 53 and 48 are supplied for calibration purposes primarily for calibrating the action of bellows 52.

Considering the operation of the device at sea level, the effective or calibrated force applied to member 43 by bellows 52 tending to move strap 59 toward the left, as viewed in FIGURE 2, will be relatively constant. The net effective force applied to strap 59 will, however, vary with vacuum effective in chamber 46. At closed engine throttle the vacuum in chamber 46 will be maximum. The net effective force applied to strap 59 tending to move valve member 20 to the left will be minimum and the pressure delivered to passage 28 will be minimum. As the engine throttle is opened to increase the fuel supply to the engine, the effective vacuum in chamber 46 will decrease such that a greater effective force will be applied on strap 59 and valve member 20 will increase the pressure delivered to passage 28. Thus, as the engine torque demand increases, the modulator pressure in passage 28 increases and as the engine torque demand decreases, the modulator pressure in passage 28 decreases.

Bellows 52 further serves as an altitude compensating device to provide desired modulator pressure in passage 28 upon change of altitude. It is well known that the torque of an internal combustion engine decreases with increase in attitude. In the absences of altitude compensation, the modulator pressures existing in passage 28 would be effective on the shift valves to cause the shifts to occur at the same shift points at high altitude as at low altitude. This is, under some operating conditions, undesirable since the available engine torque at high altitude is less than that at low altitude. The governor pressure is designed to provide a shift of transmission drive ratio, to produce a shift at certain vehicle speeds and corresponding torque. In the absence of altitude compensation provided by bellows 52 the shift feel becomes rough at high altitudes and shifts tend to occur at the same point at high altitude as at low altitude despite the changes in available engine orque. With bellows compensator 52 installed, if we assume the vehicle is operated at relatively high altitude, the available vacuum in chamber 46 will be less than is the case at low altitude. At the same time, atmospheric pressure acting on bellows 52 tending to collapse the same diminishes with increase in altitude. This permits bellows 52 to expand to decrease the modulator pressure in passage 28 at the same time that available engine torque diminishes to assure smooth shift of transmission drive ratio. As a consequence, the transmision shift points will be lowered or occur at a lower vehicle speed at high altitude than at low altitude to accomplish smoother shift of drive ratio.

With the altitude compensator so far described it will be apparent that the force acting on the modulator valve tending to move the valve to increase the modulator pressure in passage 28 is derived solely from bellows 52. If bellows 52 should become ruptured, there would be no force acting to move valve member 20 toward the left to maintain modulator pressure in passage 28. In fact, the pressure in chamber 27 and governor pressure acting upon the differential area of lands 14 and 15 will bias valve member 20 to its cutoff position wherein passage 3 is blocked off by land 21 and passage 28 is connected to exhaust through ports 13 and 14 and passage 29. Since modulator pressure is delivered to line pressure regulator valve 2 to increase regulated pressure supplied to the transmission shift valves through passage 4 and is used to oppose governor pressure acting on the shift valves to determine the shift points, such loss of modulator pressure due to rupture of bellows 52 is most undesirable. It will be understood that with loss of modulator pressure acting upon the line pressure regulator valve 2, the line pressure delivered to the transmission clutches may be insufficient at heavy torque demand to maintain the clutches engaged. Clutch slippage may result in burning up of the clutches. In addition, the shift points will not occur at proper relationship of vehicle speed and engine torque demand.

To assure adequate pressure in modulator pressure delivery passage 28 to prevent undue drop of line pressure in the event of a failure of bellows 52, a fail safe feature is incorporated into the design. Bellows 54 fixed to ground member 40 and to spring seat 55 is connected by passage 58 to the interior of bellows 52. So long as bellows 52 remains evacuated, the bellows 54 will likewise be evacuated. In normal operation, bellows 54 is effective to oppose spring 57 such that spring seat 55 remains out of contact with force transfer strap 59 such that the operation is as heretofore described. In the event that bellows 52 should for any reason rupture and lose its vacuum, air will also be admitted to the interior of bellows 54, permitting bellows 54 to expand. Raised portion 56 of spring seat 55 will thereupon contact bent up member 60 of force transfer strap 59 to apply a thrust to strap 59 tending to urge valve member 20 to admit pressure to passage 28. When vacuum bellows failure occurs, the modulator assembly functions as it normally would act in the absence of the provision for altitude compensation. This fail safe feature will permit continued operation and permit the vehicle operator to drive the vehicle to a service station without risk of damage to the transmission.

The control of a line pressure regulator valve by throttle valve pressure is old in the art as taught by the patent to Kelley 2,875,643 and main line regulator valve 2 may be of the type shown in the Kelley patent or any other type. Likewise the control of shift valves by throttle valve pressure and governor pressure is taught in Kelley and accordingly need not be shown in the present application. Applicant's fail safe feature in conjunction with an altitude compensated modulator valve is an important feature and is believed to be novel.

While the arrangement has been described as containing an evacuated bellows 52, it is apparent that the evacuation of the bellows provides a fixed reference pressure. If desired, the structure may be arranged to utilize a different reference pressure such as a pressure above standard sea level pressure in the bellows. In this event the internal structure would be rearranged to render spring 57 effective only upon loss of air at atmospheric pressure at sea level from bellows 52.

Bellows 52 normally applies a thrust to valve stem 24 urging the valve toward the left as viewed in the drawing to increase the pressure delivered by the valve. The effective force applied by bellows varies with altitude and decreases with increase in altitude. Also available manifold vacuum in chamber 46 will decrease with increase in altitude. In the event of failure of bellows 52, spring 57 will apply a force to valve stem 24 urging the valve toward the left as viewed in the drawing such that the valve will thereafter function in the manner of a nonaltitude compensated modulator valve to prevent excessive loss of modulator pressure. Since modulator pressure is used to control line pressure, the fail safe feature prevents excessive drop of line pressure and consequent burning up of the torque sustaining members of the transmission which are commonly in the form of brakes or clutches. Since bellows 52 and 54 are connected by passage 58, it will be apparent that spring 57 will become effective as a biasing means in the event of loss of reference pressure (vacuum) from either bellows 52 or 54.

What is claimed is:

1. In a transmission control system for an engine driven vehicle, means for providing a regulated fluid pressure source, a modulator valve supplied with fluid from said source and adapted to deliver a variable control pressure, modulator means controlling said modulator valve including first motor means having an essentially constant reference pressure and responsive to the difference in pressure between said reference pressure and atmospheric pressure to provide a force to control said modulator valve, a second motor means connected to said engine as a source of vacuum and responsive to the difference between atmospheric pressure and engine vacuum to provide a second force to control said modulator valve, biasing means effective at times to control said modulator valve, means normally effective to disable said biasing means, said last-mentioned means being automatically operable upon loss of said reference pressure in said first motor means to permit said biasing means to exert a biasing force on said modulator valve.

2. In a transmission control system for an engine driven vehicle, a fluid pressure source, a modulator valve supplied with pressure from said source and adapted to deliver a variable control pressure, a modulator unit for controlling said valve including a first motor means forming a chamber having an essentially constant reference pressure therein and responsive to the difference in pressure between said reference pressure and atmospheric pressure to provide a force urging said modulator valve in a first direction, a second motor means connected to said engine as a source of vacuum and responsive to the difference between atmospheric pressure and engine vacuum to provide a force urging said modulator valve in a second direction opposite to said first direction, additional biasing means effective at times to be substituted for the force of said first motor means to bias said modulator valve in said first direction, a third motor means normally operable to render said additional biasing means ineffective, said third motor means enclosing a chamber connected to said chamber of said first motor means, said additional biasing means being automatically operable upon loss of said reference pressure from said chamber of said first motor means to bias said valve in said first direction.

3. In a transmission control system for an engine driven vehicle, means for providing a regulated fluid pressure source, a modulator valve supplied with fluid pressure from said source and adapted to deliver a variable control pressure, a ground member, modulator means controlling said modulator valve including a first motor means having an essentially constant reference pressure and responsive to difference in pressure between atmospheric pressure and said reference pressure to provide a primary variable force to control said modulator valve, and second motor means connected to said engine as a source of vacuum reflective of engine torque and responsive to the difference in pressure between atmospheric pressure and engine vacuum to provide a secondary variable force to control said modulator valve to provide a modulator pressure reflective of engine torque demand and to correct for changes in engine vacuum resulting from changes in atmospheric pressure, said first motor means being fixed to said ground member and operatively connected to said modulator valve, a third motor means fixed to said ground member and responsive to said reference pressure in said first motor means, biasing means controlled by said third motor member and normally disabled by said third motor member, said third motor member being effective upon loss of said reference pressure in said first motor member to permit said biasing means to bias said modulator valve in a direction opposite to that of said second motor means.

4. In a transmission control system for an engine driven vehicle, a fluid pressure source, a modulator valve member connected to said source and adapted to deliver variable pressure to said transmission for control purposes, means for controlling said valve member including a first motor means operatively connected to said valve member for biasing said valve in a first direction to increase the pressure delivered by said valve member, a second motor means operatively connected to said valve and to said engine as a source of vacuum for applying force opposing the thrust applied to said valve member by said first motor means, said first motor means enclosing a chamber having an essentially reference pressure therein and being movable in response to variation of atmospheric pressure to vary the thrust applied to said valve member by said first motor means, the force applied to said valve member by said second motor means being varied in accordance with changes of available engine vacuum, a third motor member enclosing a chamber to said chamber of said first motor means, additional biasing means capable of applying a thrust to said valve member and opposing the biasing force applied to said valve member by said second motor means, said third motor means being normally effective to prevent said additional biasing means from exerting its thrust upon said valve member, said additional biasing means being effective to apply its thrust to said valve member upon loss of reference pressure from either said first or third motor means.

5. In a transmission control system for an engine driven vehicle, a fluid pressure source, a modulator valve member connected to said source and adapted to deliver variable pressure to said transmission for control purposes, means for controlling said valve member including a first bellows operatively connected to said valve, said bellows enclosing a chamber having a reference pressure therein, said bellows providing a thrust to said valve member which varies with changes in atmospheric pressure, a second motor means connected to said valve member and to said engine as a source of vacuum, said second motor means applying a thrust opposing the thrust of said bellows and varying in response to changes in engine manifold vacuum, a spring effective at times to apply a thrust to said valve member for biasing said valve member in the same direction as the thrust applied to said valve member by said first bellows, a second bellows enclosing a chamber connected to the chamber of said first bellows and normally effective to prevent said spring from applying its thrust to said valve member, said second bellows being effective upon loss of reference pressure from either of said chambers to permit said spring to bias said valve in a direction opposite to the thrust applied to said valve member by said second motor means.

6. In a transmission control system for an engine driven vehicle, a fluid pressure source, a modulator valve member connected to said source and adapted to deliver variable fluid pressure, a first bellows having one end fixed against movement and a second movable end, means operatively connecting said movable end to said valve member for biasing said valve member in a first direction, said bellows enclosing a chamber having a reference pressure therein, said bellows being expandable and contractible in response to variation of atmospheric pressure, a second motor operatively connected to said valve member, to said movable end of said bellows and to said engine as source of vacuum, said second motor opposing the biasing force of said bellows with a force determined by available engine vacuum, a second bellows having a fixed end and a movable end, said second bellows enclosing a chamber connected to said first bellows chamber, a spring effective at times to bias said valve member in said first direction and controlled by said second bellows, said second bellows being normally operable upon said spring to render the bias force of said spring ineffective, said second bellows being effective upon loss of said reference pressure from either of said bellows chambers to permit said spring to apply a thrust to said valve member.

7. In a transmission control system for an engine driven vehicle, a fluid pressure source, a modulator valve member connected to said source and adapted to deliver a variable pressure, a first evacuated bellows having one end fixed against movement and a movable end operatively connected to said valve member to apply a force to said valve member tending to move said valve member in a first direction, the effective force applied to said valve varying with changes in atmospheric pressure, a vacuum motor operably connected to said valve member and to said engine as a source of engine vacuum, said vacuum motor applying a force opposing the force of said bellows and which varies with changes in engine vacuum, a spring seated at one end on a fixed spring seat and at the opposite end on a movable spring seat, a second evacuated bellows having one end fixed against movement and a second end fixed to said movable spring seat, passage means connecting the space within said first bellows to the space within said second bellows, said second bellows being normally effective to prevent said spring from applying a thrust to said valve member, said second bellows being effective upon loss of vacuum in either of said bellows to permit said spring to apply a thrust to said valve member acting upon said valve member in the direction of thrust normally applied to said valve member by said first bellows.

8. In a transmission for an engine driven vehicle, a fluid pressure source, a modulator valve connected to said source and adapted to deliver a variable pressure, a ground member, a first evacuated bellows having one end fixed to said ground member and a movable end, a force transmitting member connecting said movable end to said valve member, a vacuum motor connected to said force transmitting member and connected to said engine as a source of vacuum, said evacuated bellows applying a thrust to said force transmitting member biasing said member in a first direction, said thrust being varied in response to changes in atmospheric pressure, said vacuum motor applying a thrust to said force transmitting member opposing the thrust of said bellows and varying with changes in engine vacuum, a spring seated upon said ground member, a second bellows having one end fixed to said ground member and a movable end, a spring seat fixed to said movable end and contacting said spring, said second bellows enclosing a chamber connected to the interior of said first bellows such that said second bellows is responsive to vacuum in said first bellows, said second bellows normally rendering said spring ineffective to apply force to said force transmitting member, said spring being effective upon loss of vacuum in said first bellows to move said movable spring seat into contact with said force transmitting member to apply a thrust to said valve acting in the same direction as the thrust normally applied to said valve by said first bellows.

References Cited by the Examiner
UNITED STATES PATENTS

| | | | |
|---|---|---|---|
| 2,402,499 | 6/1946 | Lawrence | 60—60 |
| 2,875,643 | 3/1959 | Kelley | 74—645 |
| 2,894,532 | 7/1959 | Gaylord | 137—505 |

SAMUEL LEVINE, *Primary Examiner.*